2,726,236

PRODUCTION OF SULFUR-CONTAINING HIGH MOLECULAR WEIGHT HYDROCARBON DERIVATIVES

Paul R. Van Ess and John Zachar, Berkeley, Calif., assignors to Shell Development Company, Emeryville, Calif., a corporation of Delaware No Drawing. Application February 2, 1953, Serial No. 334,731

10 Claims. (Cl. 260—139)

This invention relates to an improved method of synthesizing sulfur-containing derivatives of high molecular weight hydrocarbons. The invention relates more particularly to a method enabling the more efficient production of high molecular weight sulfur-containing derivatives of paraffin hydrocarbons which are used to produce improved lubricants and greases and to stabilize organic compositions.

Of the sulfur-containing derivatives of high molecular weight hydrocarbons produced heretofore certain types possess characteristics rendering them of particular value as antioxidants, anticorrosion agents, stabilizers and the like in a relatively wide field of application. Comprised among these are the sulfur-containing high molecular weight hydrocarbon derivatives obtained by reacting halogenated long chain hydrocarbons with inorganic sulfides. Included in these compositions are the high molecular weight sulfur-containing hydrocarbon derivatives known in the art as "wax-monosulfides," "wax-disulfides," and the like. These materials have been found to be useful as additives in the production of improved liquid lubricants for internal combustion engines, greases, hydraulic fluids, etc., wherein they function as anti-corrosion agents, antioxidants, stabilizing agents, etc.

The preferred high molecular weight sulfur-containing compositions contain relatively long hydrocarbon chains linked by means of a sulfur bridge. A method for their preparation used heretofore comprised reaction of a halogenated long chain hydrocarbon with an inorganic sulfide at atmospheric pressure and at relatively low temperatures. Suitability of these reaction products for use in many important fields of application is generally dependent upon a high sulfur content, a low halogen content and good stability under relatively severe conditions. Methods employed heretofore for the production of these materials have often proven to be unsatisfactory. Maintenance of both product uniformity and relatively high yields using such processes has proven difficult. Often the products do not contain a sufficiently high sulfur content and the halogen content is unduly high. These difficulties are furthermore often coupled with relatively poor stability and inadequate oil solubility. When such defects are encountered in these products the materials are not only ineffective as additives in such compositions as lubricants and greases but contribute to aggravation of the very difficulties their presence is intended to correct.

It is an object of the present invention to provide an improved method for the production of the high molecular weight sulfur-containing derivatives of hydrocarbons by interaction of halogenated high molecular weight hydrocarbons and inorganic sulfides wherein the above difficulties are obviated to at least a substantial degree, and more efficient production of a product of higher sulfur content, lower halogen content and having excellent stability characteristics is made possible.

It has now been found that more efficient production of improved high molecular weight sulfur-containing hydrocarbon derivative products by interaction of a halogenated high molecular weight hydrocarbon with an inorganic sulfide is brought about by executing the reaction under conditions differing substantially from those generally employed heretofore with respect to pressure, temperature, and the amount of water added to the reaction.

In accordance with the present invention halogenated high molecular weight hydrocarbons, such as, for example, a chlorinated paraffin wax, is reacted in alcoholic solution with an inorganic sulfide, such as sodium disulfide, at a superatmospheric pressure in the range of from about 150 to about 500 p. s. i. g., a temperature in the range of from about 125° to about 165° C., and in the presence of a sufficient amount of water to assure a molar ratio of total water to inorganic sulfide ranging from about 10:1 to about 25:1 in the starting materials.

In a preferred embodiment of the invention the reaction is executed in the presence of both an alcoholic and hydrocarbon solvent.

High molecular weight halogenated hydrocarbons employed as starting material in accordance with the invention comprise the halogenated saturated hydrocarbons containing from about 15 to about 50 carbon atoms to the molecule, and preferably from about 20 to about 30 carbon atoms to the molecule. Of the halogenated hydrocarbons those wherein the halogen is chlorine are preferred. Preferred halogenated hydrocarbon starting materials comprise the halogenated long chain, paraffinic hydrocarbons. Particularly preferred are the chlorinated normally solid hydrocarbons, for example, chlorinated paraffin wax. Suitable halogenated starting materials comprise those having a halogen content in the range of from about 15 to about 50%, and preferably from about 25 to about 35%. Particularly preferred are the chlorinated paraffin waxes having a chlorine content of about 30%. The halogenated hydrocarbons employed as starting materials may be obtained from any suitable source and need not necessarily be pure compounds. Thus, suitable halogenated hydrocarbon starting materials comprise chlorinated crude paraffin waxes, chlorinated slop waxes and the like.

Inorganic sulfides reacted with the halogenated hydrocarbons in acordance with the invention comprise the sulfides of the alkali metals. Suitable inorganic sulfides which may be employed comprise, for example, $Na_2S$, $K_2S$, $K_2S_2$, $Na_2S_2$.

In the production of the sulfur-containing high molecular weight hydrocarbon derivatives of the "wax disulfide" type in accordance with the present invention by the interaction of a halogenated hydrocarbon with an inorganic sulfide, the inorganic sulfide, such as, for example, $Na_2S$ is dissolved in water. Elementary sulfur is then added to the aqueous $Na_2S$ solution. The admixture is preferably prepared with the aid of agitating means, such as, a mechanical stirrer or the like. Heating may be resorted to to facilitate solution of the sodium sulfide. The amount of elementary sulfur added to the aqueous sodium sulfide solution is controlled to obtain a mole ratio of sulfur to sodium sulfide of about one. In a preferred method of carrying out the process of the invention the sodium sulfide is added in slight molar excess over the elementary sulfur. Thus, the ratio of sodium sulfide to elementary sulfur is preferably maintained in the range of from about 1.01 to about 1.10.

Essential to the attainment of the objects of the invention is the maintenance of the amount of water used to prepare the aqueous sulfur-containing solution within a well-defined range. The mole ratio of total water to $Na_2S$ in the aqueous $Na_2S$–S solution is maintained within the range of from 10:1 to about 25:1; preferably from about 12:1 to about 20:1; a mole ratio of $H_2O$ to $Na_2S$ of about 14:16 is particularly preferred.

The halogenated high molecular weight hydrocarbon, such as, for example, chlorinated paraffin wax, employed as starting material in the process of the invention is dissolved in a suitable solvent. Suitable solvents for the chlorinated hydrocarbon wax comprise the aliphatic alcohols, such as, for example, ethyl alcohol, propyl alcohol, isopropyl alcohol, amyl alcohol, isoamyl alcohol, their homologues, etc. The use of ethyl alcohol is somewhat preferred. The amount of alcohol employed may vary considerably within the scope of the invention. It is, however, preferably present in an amount at least sufficient to dissolve substantially all of the chlorinated hydrocarbon charge. The aqueous $Na_2S$-sulfur solution and the alcohol chlorinated hydrocarbon solution are mixed in controlled amounts to obtain an admixture containing about two atoms of chlorine for every two atoms of sulfur.

The resulting admixture comprising the alcoholic solution of chlorinated hydrocarbon and aqueous $Na_2S$-S is thereupon heated at a temperature in the range of from about 125° to about 165° C. The use of a temperature in the range of from 145 to 155° C. is preferred. The pressure during the period of heating at this temperature range is maintained in the range of from about 150 to about 500 pounds per square inch gauge (p. s. i. g.) and preferably about 145 to about 155 p. s. i. g. The use of a temperature of about 150° C and a pressure of about 230 p. s. i. g. is particularly preferred. The mixture is maintained at the reaction temperature for a time sufficiently long to effect at least a substantial interaction of the reactants charged. A reaction time in the range of from about 5 to about 25 hours is suitable. A time ranging from about 8 to about 12 hours has been found sufficient to effect substantially complete conversion. Longer or shorter reaction times may, however, be resorted to within the scope of the invention.

Execution of the process in accordance with the invention is carried out in conventional apparatus providing a suitable reaction zone wherein the above-specified reaction conditions can be maintained. Thus, the reaction may be carried out in a reaction chamber, or autoclave, provided with suitable means for heating and agitating the contents thereof, and wherein the required elevated pressures can be maintained during the course of the reaction.

The reaction is preferably carried out in the presence of a hydrocarbon solvent in addition to the alcohol solvent. The presence of the hydrocarbon solvent, it has been found, enables the obtaining of substantial increase in yield of the desired high molecular weight sulfur-containing hydrocarbon derivative product and suppresses side reactions leading to the formation of undesired high boiling resinous materials. Hydrocarbon solvents which may be employed comprise the normally liquid paraffin and aromatic hydrocarbons, such as, for example, the pentanes, hexanes, heptanes, octanes, benzene, toluene, xylene, mixtures thereof, as well as hydrocarbon fractions comprising them, etc. Although a wide variation in compositions of the hydrocarbon solvent employed is tolerated, the presence of any substantial amount of unsaturated aliphatic hydrocarbons, such as olefins or diolefins, is to be avoided.

Under the above-defined conditions, the halogenated high molecular weight hydrocarbon, the inorganic sulfide and elementary sulfur interact with the formation of reaction products comprising high molecular weight sulfur-containing hydrocarbon derivatives wherein large hydrocarbyl groups are linked to one another by means of one or more sulfur bridges. When starting with a halogenated high molecular weight open chain hydrocarbon such as, for example, chlorinated paraffin wax, the hydrocarbyl groups of the sulfur-containing derivative products which are linked by sulfur bridges will consist of long open carbon chains. At least a substantial proportion of the sulfur bridges consists of two sulfur atoms linked directly to one another by sulfur-to-sulfur linkage characteristic of the "wax-disulfide" type of materials. The high molecular weight sulfur-containing reaction products obtained comprise compositions of the type identified in the lubricating oil industry as "wax disulfides," "wax multi-bridged disulfides," etc.

The desired sulfur-containing, high molecular weight hydrocarbon derivatives are separated from the reaction mixture by separating means comprising, for example, one or more such steps as stratification, dehydration, distillation, extraction, extractive distillation, solvent extraction, and the like. Thus, the reaction mixture containing high molecular weight sulfur-containing hydrocarbon derivatives, water, $H_2S$, sodium chloride, hydrocarbon and alcohol solvent is allowed to stratify, thereby forming a supernatant hydrocarbon layer containing the desired high molecular weight sulfur-containing hydrocarbon derivatives, and an aqueous layer containing $H_2S$, salt, and alcohol solvent. The hydrocarbon layer is decanted from the aqueous layer and dried, for example, by contact with a suitable dehydrating agent, such as, for example, sodium sulfate, calcium chloride, sodium carbonate, alumina, silica gel, etc. The dried hydrocarbon layer is subjected to distillation to remove hydrocarbon solvents therefrom leaving the desired high molecular weight sulfur-containing hydrocarbon derivative as distillation bottoms. The distillation is preferably carried out at subatmospheric pressures with a maximum kettle temperature of about 140° C.

The specific conditions employed within the above-defined permissible ranges and the specific procedures followed to recover the desired sulfur-containing reaction products from the reaction mixtures will, of course, vary in accordance with the specific materials employed as charge, and are capable of modification within the scope of the invention as apparent to one skilled in the art.

The following examples are illustrative of the preparation of the sulfur-containing high molecular weight hydrocarbon derivatives in accordance with the invention.

EXAMPLE I

In a run "A" 312 g. of sodium sulfide ($Na_2S.9H_2O$) was melted by heating and 36.5 g. of elementary sulfur were dissolved therein. To the mixture there was added a solution consisting of 244 g. of chlorinated paraffin wax having a molecular weight of 368 and chlorine content of 29.0% dissolved in 660 cc. of ethyl alcohol. The resulting admixture was refluxed for 20 hours at a temperature of 80° C. at atmospheric pressure. At the end of this time the reaction mixture obtained was cooled and filtered. The filtrate was dissolved in 1500 cc. of ASTM naphtha, washed with water, dried over anhydrous sodium sulfate, filtered and the resulting filtrate stripped of the naphtha solvent by distillation.

In a second operation "B" carried out in accordance with the method of the invention 264 g. of $Na_2S.9H_2O$ was dissolved in 100 cc. of water while stirring and heating. To the solution there was added 32 g. of elementary sulfur. To the aqueous $Na_2S$-S mixture there was added a solution of 243 g. of chlorinated paraffin wax having a molecular weight of 368 and a chlorine content of 29.0%. The resulting admixture was heated in an autoclave at a temperature of 150° C. and a pressure of 230 pounds per square inch gauge for eight hours. The resulting reaction mixture was worked up substantially as described for run "A."

In the following Table I are indicated the results obtained for each of the two operations in terms of yield in grams of product, its sulfur and chlorine content, and its oil solubility.

Table I

|  | Run A | Run B |
|---|---|---|
| Pressure, p. s. i. g. | Atm. | 230 |
| Temperature, °C | 80 | 150 |
| Mol ratio of total H₂O to Na₂S in charge | 9 | 14 |
| Yield of Product in grams | 220 | 188 |
| Sulfur content of Product, Percent | 14.7 | 23.5 |
| Chlorine content of product, Percent | 7.8 | 1.3 |
| Oil solubility | (¹) | (¹) |

¹ Soluble.

Repetition of run "A" under substantially identical conditions but with the exception that the refluxing at atmospheric pressure was continued for 40 hours resulted in the obtaining of a product wherein the sulfur content of the product was still only 14.98% and the chlorine content 6.08%.

The signal advantage in the production of the sulfur-containing high molecular weight hydrocarbon derivative under conditions of the present invention is evidenced by the data of the foregoing Example I indicating the substantial increase in sulfur content and reduction of chlorine content thereby made possible.

EXAMPLE II

In a run "C" the run "B" of Example I was repeated under substantially identical conditions with the exception that 500 cc. of benzene was added to the charge. The results obtained in each of the runs "B" (of Example I) and "C" in terms of yield of product, its sulfur and chlorine content are set forth in the following Table II.

Table II

| Run | B | C |
|---|---|---|
| Pressure, p. s. i.g. | 230 | 230 |
| Temperature, °C | 150 | 150 |
| Mol ratio (Total water to Na₂S in charge) | 14 | 14 |
| Sulfur content of product, percent | 23.5 | 20.6 |
| Chlorine content of product, percent | 1.3 | 2.9 |
| Yield of Product, g | 188 | 205 |

As pointed out above, an essential feature of the process of the invention is the presence of an amount of water in the charge resulting in a mol ratio of total water to Na₂S in the charge in the range of from about 10:1 to about 25:1. The following example is illustrative of the undesirability of water in substantial excess of the prescribed range in the charge to the reaction.

EXAMPLE III

In a plurality of separate runs "D," "E," "F" and "G," Na₂S.9H₂O was dissolved in water while heating. Elemental sulfur was added to the aqueous solution, and to the resulting admixture there was added an ethyl alcohol solution of chlorinated paraffin wax, having a molecular weight of 368, the chlorine content of which was 29%. The reactants were combined in controlled amounts to have an approximate molar ratio of Na₂S to S in the charge of 1.05 to 1, and an approximate ratio of chlorine atoms (present as chlorinated paraffin wax) to total atoms of sulfur (sulfur present as Na₂S+S) of 1:1. The resulting mixtures were heated at 150° C. at a pressure of about 230 p. s. i. g. for eight hours. The reaction mixture containing the sulfur-containing high molecular weight hydrocarbon derivative product was cooled. The resulting supernatant hydrocarbon layer was separated by stratification from the aqueous layer. The hydrocarbon layer was washed with water, dried and solvents were distilled therefrom by vacuum distillation. The desired sulfur containing high molecular weight hydrocarbon derivative products were obtained as the still bottoms in the distillation. Each of the runs "D," "E," "F" and "G" was carried out under substantially identical conditions with the exception that the ratio of the total amount of water to Na₂S in the charge differed in each run. A separate run "H" was carried out under substantially identical conditions as runs "D," "E," "F" and "G," but with the exception that a larger amount of water was present and in that no alcohol solvent was used; the chlorinated wax being added as such to the aqueous Na₂S–S solution to obtain the charge to the reaction. The results obtained in terms of yield of desired sulfur-containing high molecular weight hydrocarbon derivatives and its sulfur and chlorine content, are set forth for each run in the following Table III:

Table III

| Run | D | E | F | G | H |
|---|---|---|---|---|---|
| Mol ratio total water content to Na₂S in charge | 11 | 14 | 15 | 40 | 73 |
| Yield of Product, g | 238 | 188 | 219 | 226 | 212 |
| Sulfur Content of Product, Percent | 20.3 | 23.5 | 18 | 13.8 | 0.2 |
| Chlorine Content of Product, Percent | 1.3 | 1.3 | 1.5 | 10.7 | 28.1 |

The foregoing example evidences the need for maintaining the total water content of the charge at, or below, the maximum of the range prescribed as permissible herein in order to avoid the presence of an excessively high chlorine content in the product.

EXAMPLE IV

In a run "J" 5.56 parts by weight of Na₂S.9H₂O were dissolved in 2.20 parts by weight of water. The solution was heated and 0.71 part by weight of sulfur was added. To the resulting aqueous mixture there was added a solution consisting of 5.20 parts by weight of chlorinated paraffin wax having a chlorine content of 30% and a molecular weight of about 368, dissolved in 10.43 parts by weight of ethyl alcohol. To the resulting admixture there was added 9.26 parts by weight of ASTM precipitation naphtha. The admixture was then heated in an autoclave at a temperature of 146–148° C. at pressure of 220–230 p. s. i. g. for a period of ten hours. The mixture was stirred throughout the heating period. The resulting reaction mixture was cooled and 16.5 parts by weight of water were added. Upon standing a lower aqueous layer separated from a supernatant hydrocarbon layer. The aqueous layer, comprising water, alcohol, salt and hydrogen sulfide was drawn off. The hydrocarbon layer was dried over sodium sulfate, filtered and the naphtha solvent stripped therefrom by distillation using reduced pressure and a maximum kettle temperature of 140° C. There was obtained as distillation residue, a viscous, oil soluble, dark-colored sulfur-containing high molecular weight hydrocarbon derivative identified herein as inhibitor "J" having the following composition:

| | |
|---|---|
| Specific gravity 20/4 | 1.0239 |
| Molecular weight | 1,055 |
| Sulfur content percent | 21.9 |
| Chlorine content do | 3.0 |

Sixty seven percent of the chlorine present in the chlorinated wax charge to the process was replaced by sulfur.

The properties of the product sulfur-containing high molecular weight hydrocarbon derivative of the "wax-disulfide" type are, of course, dependent to some degree upon the specific chlorinated hydrocarbon employed as starting material. They are in general viscous, oil soluble, dark colored products. When employing as starting material a trichlorinated paraffin wax having 20 to 30 carbon atoms to the molecule the high molecular weight sulfur-containing hydrocarbon derivatives obtained have a uniformly high sulfur content in the range of from about 19 to about 23% and a chlorine content below about 3.5% and generally ranging from about 1% and less to a maximum of 3%.

Although the invention is applied with advantage to the production of high molecular weight sulfur containing hydrocarbon derivatives of the type known as "wax-disulfides," that is containing multiple sulfur bridges linking hydrocarbyl groups wherein at least a substantial portion of the sulfur bridges each contain two sulfur atoms linked to one another, the process of the invention is applied with advantage to the production of high molecular weight compounds of the type known in the art as "wax-monosulfides." The so-called "wax-monosulfides" are sulfur-containing, high molecular weight hydrocarbon derivatives wherein hydrocarbyl groups are linked by sulfur bridges and wherein at least a substantial proportion of the sulfur bridges consist of a single sulfur atom linked to separate carbon atoms contained in different hydrocarbyl radicals of the compound. Such sulfur-containing high molecular weight hydrocarbon derivatives of the "wax-monosulfide" type are obtained by effecting the reaction of a chlorinated high molecular weight hydrocarbon with a sodium sulfide under the above described conditions but in the absence of elementary sulfur addition to the charge.

The following example is illustrative of the substantial advantages inherent in the use of the process of the invention, employing high temperatures and pressures and controlled quantities of water in the preparation of these materials. The example indicates the importance of the presence of the added water in an amount above the prescribed minimum amount.

EXAMPLE V

In a run "K" 312 grams of $Na_2S.9H_2O$ were dissolved in 150 cc. of water. To the aqueous solution there was added an alcoholic solution consisting of 244 grams of chlorinated paraffin wax having a chlorine content of 29.0% and a molecular weight of 368, dissolved in 600 cc. of ethyl alcohol. To the resulting admixture there was added 600 cc. of ASTM precipitation naphtha. The resulting admixture was placed in an autoclave and heated therein at a temperature of 150° C. and at a pressure of about 225 lbs. for a period of eight hours. The resulting reaction mixture was cooled and the sulfur-containing high molecular weight hydrocarbon derivative product was separated therefrom by the successive steps of stratification, decantation, drying, and vacuum distillation, substantially as described for the recovery of the product in the foregoing Example IV.

The operation was repeated in a run "L" under substantially identical conditions with the exception that addition of water to the charge was omitted, the alcoholic chlorinated wax solution being added to the $Na_2S.9H_2O$. The results obtained in each of the two operations are indicated in the following Table IV in terms of yield of the sulfur-containing high molecular weight hydrocarbon derivatives and sulfur and chlorine contents thereof.

Table IV

| Run | K | L |
|---|---|---|
| Mol ratio of total water content to $Na_2S$ in charge | 15.4 | 9 |
| Yield of product, g | 210 | 210 |
| Sulfur content of product, percent | 10.3 | 2.97 |
| Chlorine content of product, percent | 3.9 | 11.03 |
| Theoretical sulfur content, percent | 13.1 | 13.1 |

The sulfur-containing high molecular weight hydrocarbon derivatives obtained in accordance with the present invention are valuable additives in the production of improved liquid lubricants for internal combustion engines, greases, hydraulic fluids and similar organic compositions, wherein they function to impart valuable properties evidenced by one or more such characteristics as improved resistance to oxidation and decomposition, reduction in corrosive tendencies, etc. They are of particular value as components of the improved mineral oil lubricants employed in internal combustion engines of modern design.

EXAMPLE VI

The effect of the sulfur-containing, high molecular weight hydrocarbon derivatives prepared in accordance with the invention upon the corrosivity of detergent lubricating oils was tested by the procedure known as the thrust bearing corrosion test, as described in the publication National Petroleum News, September 17, 1941 pp. R-294-296. Conditions of the test employed comprised the use of Cu-Pb bearings, a time of 20 hours at 2400 R. P. M. at a load of 125 p. s. i. A highly refined SAE 30 detergent lubricating oil was divided into five portions. To one portion no sulfur-containing inhibitor was added, to two of the portions there was added the sulfur-containing, high molecular weight hydrocarbon derivative "J" prepared in accordance with the invention as set forth in the foregoing Example IV. To each of the remaining two portions there was added a different, commercially available sulfur-containing inhibitor identified in the table below. Each portion was tested by the thrust bearing corrosion test procedure, the results of which are indicated in the following Table V:

Table V

| Additive | Sulfur Content in Percent ΔS | Bearing loss in mg. per sq. cm. | | | |
|---|---|---|---|---|---|
| | | 110 | 130 | 150 | 160 |
| None | 0 | 0.1 | 28.1 | 74.5 | |
| Inhibitor "J" | 0.10 | | 0.1 | 0.0 | 0.2 |
| Sulfurized $C_2.C_{25}$ olefin | 0.10 | 0.1 | 0.3 | 4.0 | 13.5 |
| Sulfurized Sperm oil | 0.10 | | 1.2 | 9.6 | 35.6 |
| Inhibitor "J" | 0.20 | 0 | 0.3 | 0.5 | 0.4 |

EXAMPLE VII

A highly refined mineral lubricating oil SAE 120 was divided into six portions. No inhibitor was added to one portion. To two other portions there was added a commercially available inhibitor identified in the following Table VI (ΔS=0.1%). Each portion was then subjected to the oxidation test (described in Ind. Eng. Chem. v. 35, page 584, May 1943) to determine the time required for the absorption of 1800 cc. of oxygen by 100 g. of oil in the presence of 1 cm.² of copper surface/gram of oil at 150° C. Results for each of the seven samples are given in the following Table VI.

Table VI

| Inhibitor, ΔS=0.1% | Time in Hours |
|---|---|
| None | 11.9 |
| Inhibitor "J" | 53.5 |
| Do | 53.4 |
| Sulfurized Sperm oil | 39 |
| 2,2'diaminodiphenyldisulfide | 38.7 |
| Zinc-dibutyldithiocarbamate | 39.1 |

EXAMPLE VIII

The anticorrosion performance of the sulfur-containing high molecular weight hydrocarbon derivatives of the present invention were tested in accordance with the Chevrolet engine test using procedure L-4-243 of the cooperative lubricants tests program. As reference oil there was used a highly refined detergent lubricating oil SAE 30. The reference oil was divided into five portions. To one portion no sulfur-containing inhibitor was added, to another portion there was added the sulfur-containing high molecular weight hydrocarbon derivative, inhibitor "J," prepared in accordance with the invention as set forth in the foregoing Example IV. To each of the remaining three portions there was added a different, commercially available sulfur-containing anti-corrosion inhibitor. The results obtained were as follows:

Table VII

| Inhibitor | Bearing Loss, mg./cm.² | Used oil Sap. No., mg., KOH/g. |
|---|---|---|
| None | 18.3 | 30.9 |
| Inhibitor "J" ΔS=0.2% | 2.4 | 18.7 |
| Sulfurized olefin ΔS=0.2% | 16.4 | 22.8 |
| 1% w.—Reaction Product of Pine Oil and P₂S₅ | 2.5 | 28.9 |
| 0.4% w. Zinc-dibutyl-dithiocarbamate | 10.6 | 11.3 |

EXAMPLE IX

A highly refined lubricating oil SAE 20 was divided into five portions. To one portion there was added no sulfur-containing additive. To another there was added the sulfur-containing high molecular weight hydrocarbon derivative, Inhibitor "J," prepared in accordance with the invention as set forth in the foregoing Example IV. To each of the three other portions there was added a different, commercially available sulfur-containing additive. Each of the portions was then tested to determine ability of the additive to decrease surface wear of the oil containing it in a multiple Four Ball machine similar in principle to the Boerlage apparatus described in "Engineering," vol. 136, July 14, 1933. This apparatus comprises four steel balls arranged in pyramid formation. The top ball is rotated by a spindle against the three bottom balls which are clamped in a stationary ball holder. All balls are immersed in the oil to be tested. The tests are run for two hours at 700 R. P. M. under a 7 kg. load and at a controlled temperature of 130° C. Diameters of the wear scars worn on the three balls forming the base of the pyramid are then measured, and the average taken as the true indication of wear. Results were as follows:

Table VIII

| Additive | Scar diameter in mm. at 130° C. |
|---|---|
| None | 0.66 |
| Inhibitor "J" | 0.39 |
| Dilauryl disulfide | 0.45 |
| Amylphenol monosulfide | 0.59 |
| Octylphenol disulfide | 0.41 |

The invention claimed is:

1. The process for the production of improved additives for liquid lubricants consisting essentially of sulfur-containing high molecular weight hydrocarbon derivatives containing more than one sulfur bridge between carbon chains, which comprises reacting a halogenated high molecular weight hydrocarbon in alcoholic solution with an inorganic sulfide at a pressure of from about 150 to about 500 pounds per square inch gauge, a temperature of from about 125° to about 165° C., and in the presence of a mole ratio of water to said inorganic sulfide in the range of from about 10:1 to about 25:1.

2. The process in accordance with claim 1 wherein said halogenated high molecular weight hydrocarbon is a halogenated paraffin having from 20 to 30 carbon atoms to the molecule.

3. The process in accordance with claim 1 wherein said halogenated high molecular weight hydrocarbon is a chlorinated paraffin wax and said inorganic sulfide is sodium sulfide.

4. The process for the production of improved additives for liquid lubricants consisting essentially of sulfur-containing high molecular weight hydrocarbon derivatives having more than one sulfur bridge linking carbon chains, which comprises reacting a halogenated high molecular weight hydrocarbon having from 20 to 50 carbon atoms in the molecule in alcoholic solution with an inorganic sulfide and elementary sulfur at a pressure of from about 150 to about 500 pounds per square inch gauge, a temperature of from about 125° to about 165° C., and in the presence of a mol ratio of water to said inorganic sulfide in the range of from 10:1 to about 25:1.

5. The process in accordance with claim 4 wherein said halogenated high molecular weight hydrocarbon is a halogenated high molecular weight paraffin having from 20 to 30 carbon atoms to the molecule.

6. The process in accordance with claim 4 wherein said halogenated high molecular weight hydrocarbon is a chlorinated paraffin wax.

7. The process in accordance with claim 4 wherein said inorganic sulfide is sodium sulfide.

8. The process for the production of improved additives for liquid lubricants consisting essentially of sulfur-containing high molecular weight hydrocarbon derivatives having more than one sulfur bridge between carbon chains, which comprises reacting a chlorinated paraffin wax in alcoholic solution with sodium sulfide and elementary sulfur in the presence of a hydrocarbon solvent and a mol ratio of water to sodium sulfide of from 10:1 to about 25:1, at a pressure of from about 150 to about 500 pounds gauge, and at a temperature of from about 125° to about 165° C.

9. The process for the production of improved additives for liquid lubricants consisting essentially of sulfur-containing high molecular weight hydrocarbon derivatives containing more than one sulfur bridge between carbon chains, which comprises reacting a chlorinated paraffin wax having a chlorine content of 30% in alcoholic solution with sodium sulfide and elementary sulfur in the presence of a hydrocarbon solvent and a mol ratio of total water to sodium sulfide of from about 10:1 to about 25:1, at a pressure of from about 200 to 350 pounds per square inch gauge, and a temperature of from about 145° to about 155° C.

10. The process in accordance with claim 9 wherein the mole ratio of water to sodium sulfide is from about 12:1 to about 20:1.

References Cited in the file of this patent

UNITED STATES PATENTS

| 2,514,625 | Clausen | July 11, 1950 |
| 2,573,953 | Buckmann | Nov. 6, 1951 |

FOREIGN PATENTS

| 361,356 | Great Britain | Nov. 19, 1931 |